United States Patent
Wieczorek et al.

(10) Patent No.: US 8,517,185 B2
(45) Date of Patent: *Aug. 27, 2013

(54) TWO STAGE FUEL WATER SEPARATOR AND PARTICULATE FILTER UTILIZING PLEATED NANOFIBER FILTER MATERIAL

(75) Inventors: Mark Wieczorek, Cookeville, TN (US); Terry Shults, Cookeville, TN (US); William Haberkamp, Cookeville, TN (US); Jonathan Sheumaker, Cookeville, TN (US); Barry M. Verdegan, Stoughton, WI (US); Christopher E. Holm, Madison, WI (US); Brian W. Schwandt, Fort Atkinson, WI (US)

(73) Assignee: Cummins Filtration IP, Inc., Minneapolis, MN (US)

(*) Notice: Subject to any disclaimer, the term of this patent is extended or adjusted under 35 U.S.C. 154(b) by 403 days.

This patent is subject to a terminal disclaimer.

(21) Appl. No.: 12/820,784

(22) Filed: Jun. 22, 2010

(65) Prior Publication Data
US 2011/0168621 A1 Jul. 14, 2011

Related U.S. Application Data

(63) Continuation-in-part of application No. 12/247,502, filed on Oct. 8, 2008, now Pat. No. 8,360,251, and a continuation-in-part of application No. 12/780,392, filed on May 14, 2010.

(60) Provisional application No. 61/179,939, filed on May 20, 2009, provisional application No. 61/179,170, filed on May 18, 2009, provisional application No. 61/178,738, filed on May 15, 2009.

(51) Int. Cl.
| | |
|---|---|
| *B01D 27/00* | (2006.01) |
| *B01D 29/00* | (2006.01) |
| *B01D 35/00* | (2006.01) |
| *B01D 35/28* | (2006.01) |
| *B01D 39/00* | (2006.01) |
| *B01D 28/07* | (2006.01) |

(52) U.S. Cl.
USPC .......... 210/490; 210/295; 210/314; 210/315; 210/323.1; 210/323.2; 210/335; 210/337; 210/338; 210/342; 210/435; 210/437; 210/455; 210/487; 210/488; 210/489; 210/492; 210/493.1; 210/493.2; 210/DIG. 5

(58) Field of Classification Search
None
See application file for complete search history.

(56) References Cited

U.S. PATENT DOCUMENTS
| | | |
|---|---|---|
| 3,228,527 A | 1/1966 | McPherson |
| 3,390,780 A | 7/1968 | Bennett |

(Continued)

FOREIGN PATENT DOCUMENTS
WO 2010042706 4/2010

OTHER PUBLICATIONS

International Search Report for PCT/US2011/031259 dated Oct. 28, 2011.

(Continued)

*Primary Examiner* — Benjamin Kurtz
(74) *Attorney, Agent, or Firm* — Andrus, Sceales, Starke & Sawall, LLP

(57) ABSTRACT

A water separator and particulate filter with a first or outer stage configured to coalesce water from fluid such as fuel, and a second or inner stage configured to separate coalesced water from the fluid and also remove fine solid contaminants from the fluid. The coalescing stage includes a pleated cylinder of polymeric media. The pleated cylinder has pleat valleys and downstream pleat tips, and release sites defined at the downstream pleat tips. The separator stage includes a non-pleated cylinder of polymeric media surrounding and in contact with outer pleat tips of a multi-layer pleated cylinder.

23 Claims, 8 Drawing Sheets

(56) References Cited

U.S. PATENT DOCUMENTS

| | | | |
|---|---|---|---|
| 3,951,814 A | 4/1976 | Krueger | |
| 3,960,719 A | 6/1976 | Bresson | |
| 4,039,441 A | 8/1977 | Fett | |
| 4,052,316 A | 10/1977 | Berger, Jr. et al. | |
| 4,078,965 A | 3/1978 | Berger, Jr. et al. | |
| 4,081,373 A | 3/1978 | Rozniecki | |
| 4,083,778 A | 4/1978 | McGrew | |
| 4,199,447 A | 4/1980 | Chambers et al. | |
| 4,213,863 A | 7/1980 | Anderson | |
| 4,251,369 A | 2/1981 | Casad et al. | |
| 4,304,671 A | 12/1981 | Labaquere | |
| 4,372,847 A | 2/1983 | Lewis | |
| 4,640,781 A | 2/1987 | Hughes | |
| 4,643,834 A | 2/1987 | Batutis | |
| 4,759,782 A | 7/1988 | Miller et al. | |
| 4,790,947 A | 12/1988 | Arnold | |
| 4,888,117 A | 12/1989 | Brown et al. | |
| 5,006,260 A | 4/1991 | Roques et al. | |
| 5,037,454 A | 8/1991 | Mann | |
| 5,068,035 A | 11/1991 | Mohr | |
| 5,080,802 A | 1/1992 | Cairo, Jr. et al. | |
| 5,112,498 A | 5/1992 | Davies | |
| 5,156,745 A | 10/1992 | Cairo, Jr. et al. | |
| 5,174,907 A | 12/1992 | Chown et al. | |
| 5,242,604 A | 9/1993 | Young et al. | |
| 5,275,729 A | 1/1994 | Gris | |
| 5,401,404 A | 3/1995 | Strauss | |
| 5,417,848 A | 5/1995 | Erdmannsdorfer et al. | |
| 5,439,588 A | 8/1995 | Chown et al. | |
| 5,443,724 A | 8/1995 | Williamson et al. | |
| 5,454,937 A | 10/1995 | Lewandowski | |
| 5,454,945 A | 10/1995 | Spearman | |
| 5,468,382 A | 11/1995 | Cook et al. | |
| 5,468,385 A | 11/1995 | Inoue | |
| 5,480,547 A | 1/1996 | Williamson et al. | |
| 5,500,132 A | 3/1996 | Elmi | |
| 5,565,078 A | 10/1996 | Sams et al. | |
| 5,575,896 A | 11/1996 | Sams et al. | |
| 5,616,244 A | 4/1997 | Seurau et al. | |
| 5,643,431 A | 7/1997 | Sams et al. | |
| 5,656,173 A | 8/1997 | Jordan et al. | |
| 5,750,024 A | 5/1998 | Spearman | |
| 5,762,810 A | 6/1998 | Pelton et al. | |
| 5,800,597 A | 9/1998 | Perrotta et al. | |
| 5,861,087 A | 1/1999 | Manning | |
| 5,874,008 A | 2/1999 | Hirs | |
| 6,056,128 A | 5/2000 | Glasgow | |
| 6,083,380 A | 7/2000 | Selby et al. | |
| 6,099,729 A | 8/2000 | Cella et al. | |
| 6,149,408 A | 11/2000 | Holt | |
| 6,302,932 B1 | 10/2001 | Unger et al. | |
| 6,332,987 B1 | 12/2001 | Whitney et al. | |
| 6,419,721 B1 | 7/2002 | Hunter | |
| 6,422,396 B1 | 7/2002 | Li et al. | |
| 6,517,615 B2 | 2/2003 | Miller et al. | |
| 6,605,224 B2 | 8/2003 | Aymong | |
| 6,716,349 B2 | 4/2004 | Baracchi et al. | |
| 6,730,236 B2 | 5/2004 | Kouba | |
| 6,740,358 B2 | 5/2004 | Speece, Jr. et al. | |
| 6,767,459 B1 | 7/2004 | Sinker et al. | |
| 6,811,693 B2 | 11/2004 | Nilsen et al. | |
| 6,884,349 B1 | 4/2005 | Jiang | |
| 6,907,997 B2 | 6/2005 | Thacker et al. | |
| 7,198,718 B1 | 4/2007 | Turnbull | |
| 7,235,177 B2 | 6/2007 | Herman et al. | |
| 7,297,279 B2 | 11/2007 | Johnson et al. | |
| 7,326,266 B2 | 2/2008 | Barnwell | |
| 7,416,657 B2 | 8/2008 | Kretchmar | |
| 7,527,739 B2 | 5/2009 | Jiang et al. | |
| 7,648,565 B2 | 1/2010 | Clausen et al. | |
| 2004/0060858 A1 | 4/2004 | Lucas et al. | |
| 2006/0137318 A1 | 6/2006 | Lim et al. | |
| 2006/0242933 A1 | 11/2006 | Webb et al. | |
| 2007/0039865 A1 | 2/2007 | Jiang et al. | |
| 2007/0062886 A1 | 3/2007 | Rego et al. | |
| 2007/0062887 A1 | 3/2007 | Schwandt et al. | |
| 2007/0084776 A1 | 4/2007 | Sasur | |
| 2007/0107399 A1 | 5/2007 | Schwandt et al. | |
| 2007/0131235 A1 | 6/2007 | Janikowski et al. | |
| 2007/0289915 A1 | 12/2007 | Jiang et al. | |
| 2008/0053888 A1* | 3/2008 | Ellis et al. | 210/338 |
| 2008/0070022 A1 | 3/2008 | Umezu et al. | |
| 2009/0020465 A1 | 1/2009 | Jiang et al. | |
| 2009/0065419 A1 | 3/2009 | Jiang | |
| 2009/0134097 A1 | 5/2009 | Kerfoot | |
| 2009/0188870 A1 | 7/2009 | Schroeder et al. | |
| 2009/0250402 A1 | 10/2009 | Jiang et al. | |
| 2010/0101993 A1 | 4/2010 | Wells et al. | |
| 2010/0219117 A1* | 9/2010 | Reiland et al. | 210/256 |

OTHER PUBLICATIONS

Written Opinion for PCT/US2011/031259 dated Oct. 28, 2011.
International Search Report for PCT/US2011/031257 dated May 28, 2011.
Written Opinion for PCT/US2011/031257 dated May 28, 2011.
International Search Report for PCT/US2011/031259 dated May 24, 2011.
Written Opinion for PCT/US2011/031259 dated May 24, 2011.
International Preliminary Report on Patentability, PCT/US2011/031259, date of mailing Jan. 10, 2013.
International Preliminary Report on Patentability, PCT/US2011/031257, date of mailing Jan. 10, 2013.

* cited by examiner

TWO STAGE FUEL WATER SEPARATOR AND PARTICULATE FILTER UTILIZING PLEATED NANOFIBER FILTER MATERIAL

CROSS-REFERENCE TO RELATED APPLICATIONS

The present application is a continuation-in-part under 35 U.S.C. §120 of U.S. application Ser. No. 12/247,502, filed on Oct. 8, 2008, the content of which is incorporated herein by reference in its entirety. The present application also is a continuation-in-part under 35 U.S.C. §120 of U.S. application Ser. No. 12/780,392, filed on May 14, 2010, which claims the benefit under 35 U.S.C. §119(e) to U.S. Provisional Application Nos. 61/179,939, filed on May 20, 2009; 61/179,170, filed on May 18, 2009; and 61/178,738; filed on May 15, 2009, the contents of which are incorporated herein by reference in their entireties.

In addition, the subject matter of this disclosure relates to U.S. patent application Ser. No. 12/820,791, filed on Jun. 22, 2010, titled Modular Filter Elements For Use In A Filter-In-Filter Cartridge.

FIELD

This disclosure pertains to a fuel water separator and particulate filter designed to provide high water and particulate removal efficiency.

BACKGROUND

Fluid filters are widely known and used in various filtration systems and applications, for instance where there is a need for particle and/or fluid separation from a working fluid in a protected system. As one example, fuel filtration systems for engines are well known and can employ fluid filters that are aimed at water and particle separation from the fuel. Filter cartridges in some of these filters have one filter element with media configured to coalesce water, and have another filter element that has media configured to further filter the fuel and separate the coalesced water from the fuel. In many cases, the filter elements are arranged in a concentric filter within a filter configuration, where an outer filter element surrounds an inner filter element.

SUMMARY

A filter is described that has improved fuel water separation over the life of the filter. The filter is a two stage configuration, for example a concentric filter within a filter configuration, with the first or outer stage being configured primarily to coalesce water from the fuel or other fluid with which the filter is used, and the second or inner stage being configured to separate coalesced water from the fluid and also remove fine solid contaminants from the fluid. The filter is preferably configured for use with fuel, such as ultra low sulfur diesel (ULSD) or biodiesel, but the concepts of the filter described herein could be employed with any type of fluid requiring water separation from the fluid, for example hydraulic fluid, oil or lubrication fluid, air, and the like. When used with ULSD, biodiesel or other fuels having low interfacial tensions (IFTs), for example IFTs less than about 15 dynes/cm, improved fuel water separation is achieved.

In one embodiment, the filter can be made from all polymeric materials. For example, the two stages of the filter, including the media and endcaps, can be made of thermoplastic material(s) to facilitate disposal of the filter such as by recycling or incineration. The use of all polymeric (for example thermoplastic) media layers allows better bonding of adjacent media layers to each other. In addition, polymeric media provides better chemical resistance/compatibility compared to media formed from other non-polymeric material. Further, certain media properties, for example pore size and pore size distribution, are better controlled using polymeric media.

Although the filter will primarily be described as a two stage configuration, the first stage could be used by itself in a single stage configuration, used in combination with different second stage designs, or used in combination with two or more additional stages. Likewise, the second stage could be used by itself in a single stage configuration, used in combination with different first stage designs, or used in combination with two or more additional stages.

In one embodiment, a coalescing fluid filter includes a pleated cylinder of polymeric media configured to coalesce water that is in fluid. The pleated cylinder of polymeric media has pleat valleys and downstream pleat tips, and release sites at or adjacent the downstream pleat tips.

In one embodiment, the pleated cylinder of media has opposite ends that are fixed to endcaps, for example using an adhesive, embedding the ends in the endcaps which are preferably made of polymeric (for example thermoplastic) material, using mechanical fasteners, or using other suitable fixation techniques. The pleated cylinder can have a single layer or a plurality of layers of media.

The release sites can be located at, for example, junctures of the downstream pleat tips and a non-pleated cylinder of polymeric (for example thermoplastic) media, or located at apertures formed in the downstream pleat tips. When a non-pleated cylinder is used adjacent to the pleat tips, the distance between the inner tips of the pleated cylinder and the non-pleated cylinder is such that there is no significant gap or separation between the two. The pleat tips of the pleated cylinder can be fixed to or not fixed to the outer surface of the non-pleated cylinder. Also, a support cylinder for supporting the media can be disposed between the pleat tips and the non-pleated cylinder, or disposed within and surrounded by the non-pleated cylinder.

In the case of a two stage configuration, a first stage is disposed upstream of a second stage with a gap therebetween. For example, the first and second stages can be in a filter in filter arrangement, with the first stage being an outer stage and the second stage being an inner stage. The outer stage includes a pleated cylinder of polymeric (for example thermoplastic) media configured to coalesce water that is in a fluid. The pleated cylinder has pleat valleys and downstream pleat tips, and release sites at the downstream pleat tips. The inner stage includes a non-pleated cylinder of polymeric (for example thermoplastic) media surrounding a multi-layer pleated cylinder of polymeric (for example thermoplastic) media, and the inner stage is configured to separate coalesced water from the fluid and remove fine solid contaminants from the fluid.

The outer stage and the inner stage may be fixed to endcaps. The endcaps may be separate so that the outer stage includes endcaps attached to opposite ends thereof and the inner stage includes endcaps attached to opposite ends thereof. In another embodiment, the outer stage and the inner stage may share one or both endcaps, whereby a single, common endcap is attached to one end of each of the outer stage and the inner stage, and a single, common endcap is attached to the opposite end of each of the outer stage and the inner stage.

DETAILED DESCRIPTION

A two stage filter configuration with a first stage that is configured primarily to coalesce water from a fluid with which the filter is used, and a second stage that is configured to separate coalesced water from the fluid and also remove fine solid contaminants from the fluid. The fluid initially flows through the first stage followed by flowing through the second stage. Although the filter will primarily be described as having a two stage configuration, the first stage could be used by itself in a single stage configuration, used in combination with different second stage designs than those described herein, or used in combination with two or more additional stages. Likewise, the second stage could be used by itself in a single stage configuration, used in combination with different first stage designs than those described herein, or used in combination with two or more additional stages.

The filter is preferably configured for use with fuel, preferably diesel fuel such as ULSD, biodiesel or other fuels having low IFTs, to filter the fuel prior to reaching an engine where the fuel is combusted. However, the concepts of the filter described herein could be employed with any type of fluid requiring water separation from the fluid, for example hydraulic fluid, oil or lubrication fluid, air, and the like.

Figure 1:
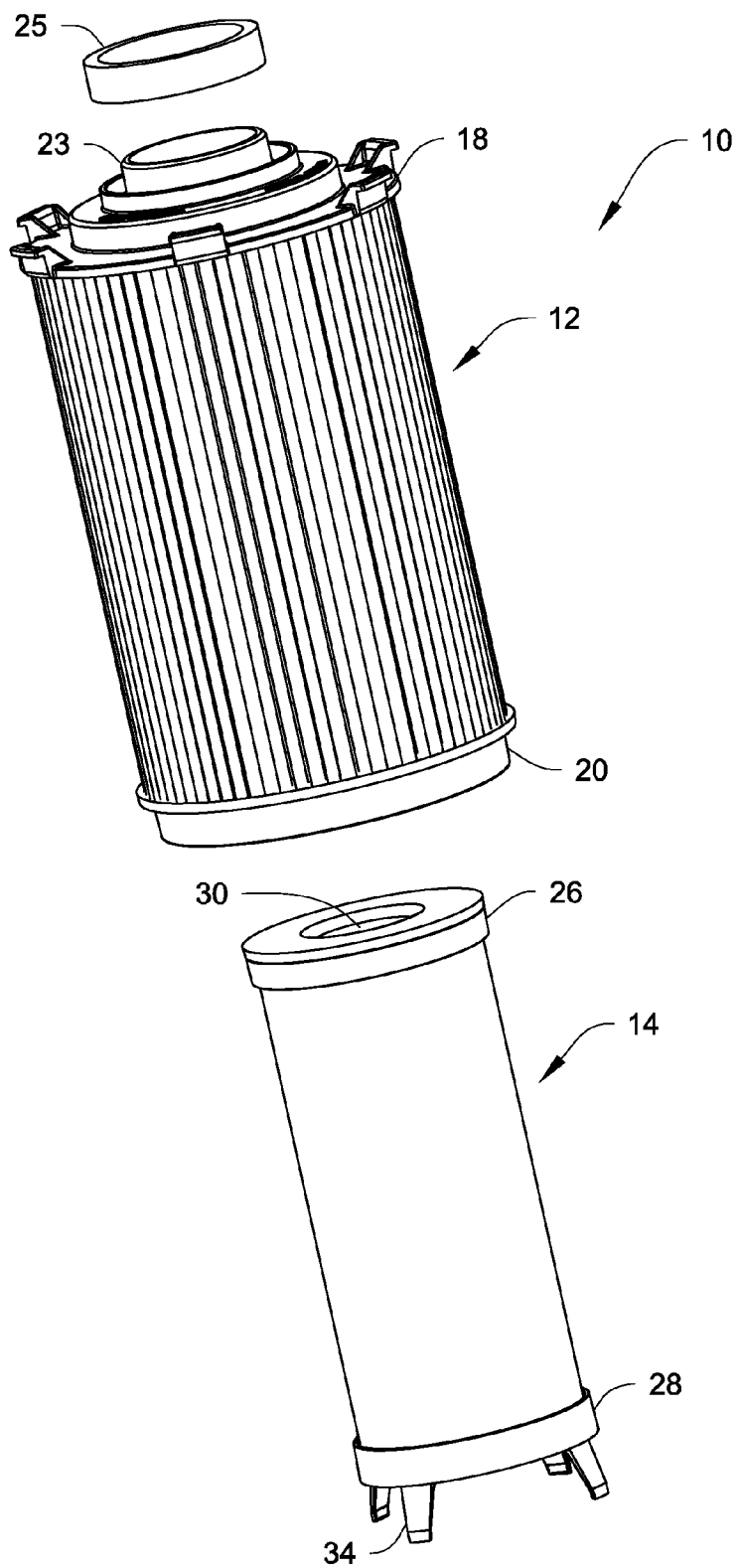
FIG. 1 is an exploded view of one embodiment of a two stage filter described herein.
Figure 2:
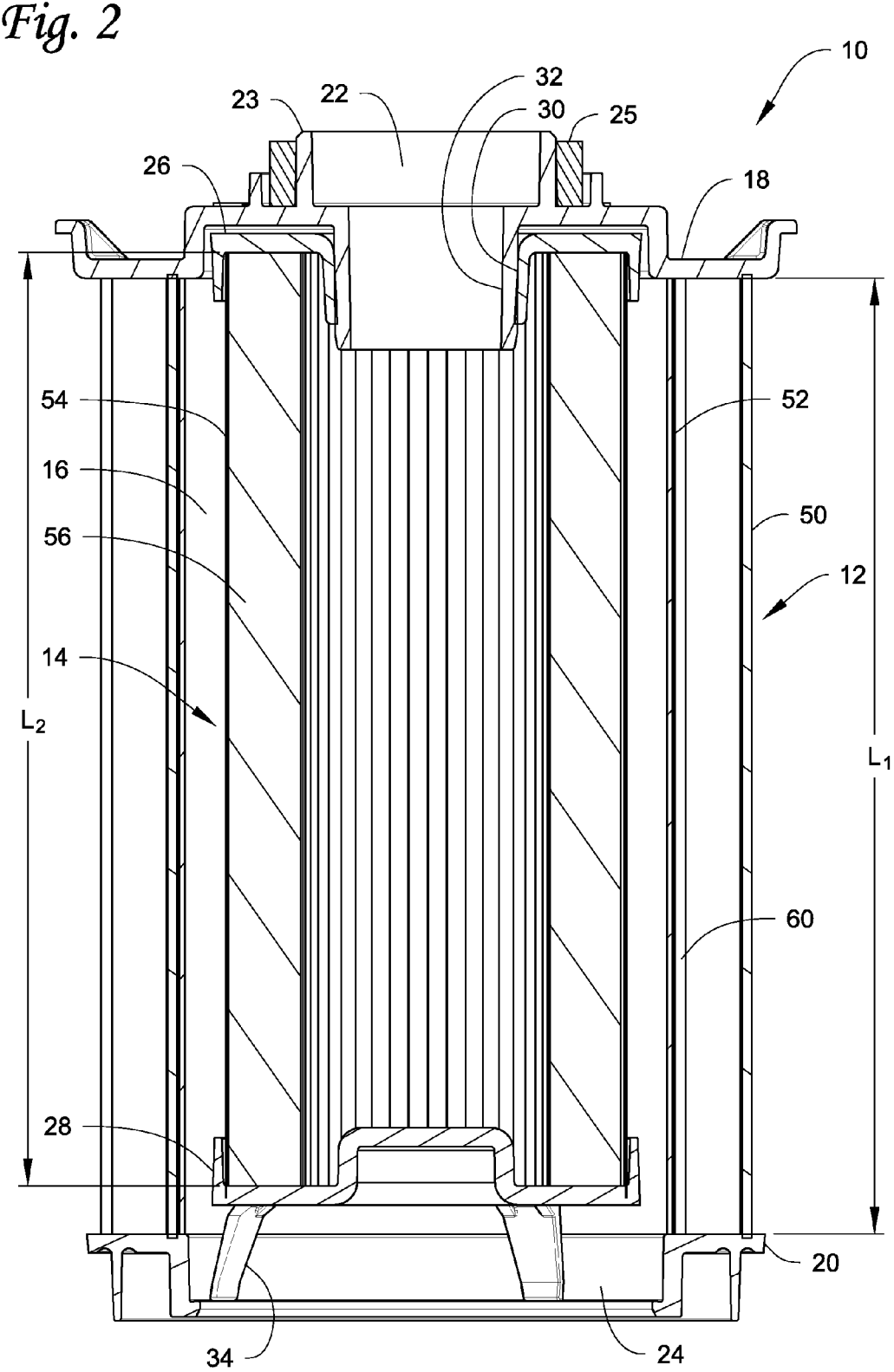
FIG. 2 is a cross-sectional view of the two stage filter of FIG. 1 in an assembled state.

FIGS. 1 and 2 illustrate an example of a two stage filter 10 having a first, upstream stage 12 that is configured primarily to coalesce water from the fluid, and a second stage 14 downstream from the first stage 12 that is configured to separate coalesced water from the fluid and also remove fine solid contaminants from the fluid. In this example, the filter 10 is a filter in filter construction configured for outside-in flow, with the first stage 12 being an outer coalescer stage and the second stage 14 being an inner separator stage, with the outer stage surrounding the inner stage with a gap 16 therebetween. The filter 10 is configured to be disposed within a filter housing with the housing then being secured to a filter head. An example of this type of filter housing and attachment to a head employed with a single stage filter is described in U.S. Patent Application Publication No. 2007/0267338.

An endcap 18 is connected to a first or upper end of the first stage 12 and an endcap 20 is connected to a second or lower end of the first stage. The endcaps 18, 20 are made of polymeric material, for example thermoplastic material, and the ends of the first stage media are suitably fixed to the endcaps, for example using an adhesive, embedding the ends of the media in the endcaps, or other suitable fixation techniques. In another embodiment, the endcaps 18, 20 can be made of non-polymeric material, for example metal, with the ends of the media fixed to the metal endcaps using a potting material know in the art.

As shown in FIG. 2, the endcap 18 includes a central opening 22 defined by a sleeve 23 that forms a fluid outlet passageway for fluid that has been filtered by the filter 10. An elastomeric gasket 25 surrounds the sleeve 23 for sealing engagement with the filter head when the filter and filter housing are installed. The endcap 20 includes an opening 24 that allows insertion of the second stage 14 within the first stage 12 during assembly of the filter.

In addition, an endcap 26 is connected to a first or upper end of the second stage 14 and an endcap 28 is connected to a second or lower end of the second stage. The endcaps 26, 28 are also made of polymeric material, for example thermoplastic material, and the ends of the second stage media are suitably fixed to the endcaps, for example using an adhesive, embedding the ends of the media in the endcaps, or other suitable fixation techniques. In another embodiment, the endcaps 26, 28 are made of non-polymeric material, for example metal, with the ends of the media fixed to the metal endcaps using a potting material known in the art.

The endcap 26 includes a central opening 30 (see FIGS. 1, 2 and 5) that allows the endcap 26 to slide over and onto a cylindrical tube 32 (see FIG. 2) extending downwardly from the endcap 18 and forming a part of the central opening 22. The endcap 28 is generally closed to prevent flow of fuel through the endcap 28.

The first stage 12 and the second stage 14 can be connected together using any suitable connection technique. An example of a suitable connection technique is described in U.S. Patent Application Publication No. 2009/0065425. Utilizing the technique described in Publication No. 2009/0065425, the endcaps 18, 26 can be connected via crush ribs, while the endcaps 20, 28 can be connected via the use of resilient arms 34 that snap fit connect with the endcap 20.

FIGS. 1 and 2 illustrate that the endcaps 18, 20 of the first stage 12 are separate from the endcaps 26, 28 of the second stage 14. However, in another embodiment, the first stage 12 and the second stage 14 may share common endcaps, whereby a single, common endcap is attached to the first or upper ends of the first stage and the second stage, and a single, common endcap is attached to the second or lower ends of the first stage and the second stage. An example of a first stage and a second stage sharing common endcaps can be found in U.S. Patent Application Publication No. 2007/0289915.

Figure 3:
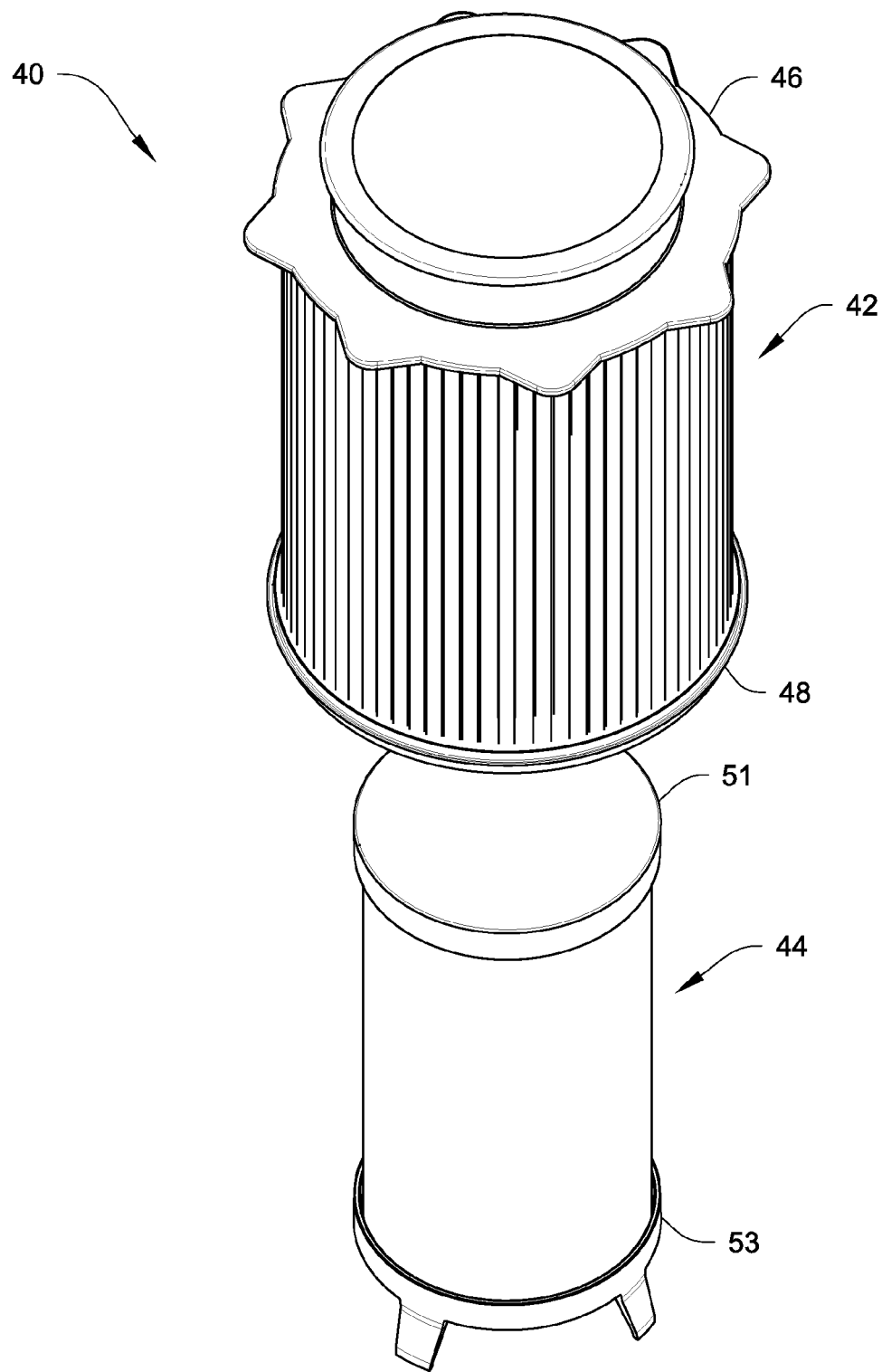
FIG. 3 is an exploded view of another embodiment of a two stage filter that can employ the concepts described herein.

FIG. 3 is an exploded view of another embodiment of a two stage filter 40 configured as a filter in filter construction for outside-in flow, that can employ the inventive concepts described herein, with a first stage 42 being an outer coalescer stage and a second stage 44 being an inner separator stage, with the outer stage surrounding the inner stage with a gap therebetween. The filter media of the first stage 42 and the filter media of the second stage 44 are connected to endcaps 46, 48 and 51, 53, respectively, in the same manner as described above for the endcaps 18, 20, 26, 28, although a common endcap can be used at each end as well. The filter 40 is configured to be installed over a standpipe within a filter housing. Further details on this general type of two stage filter construction are disclosed in U.S. Patent Application Publication No. 2009/0065425.

Figure 4:
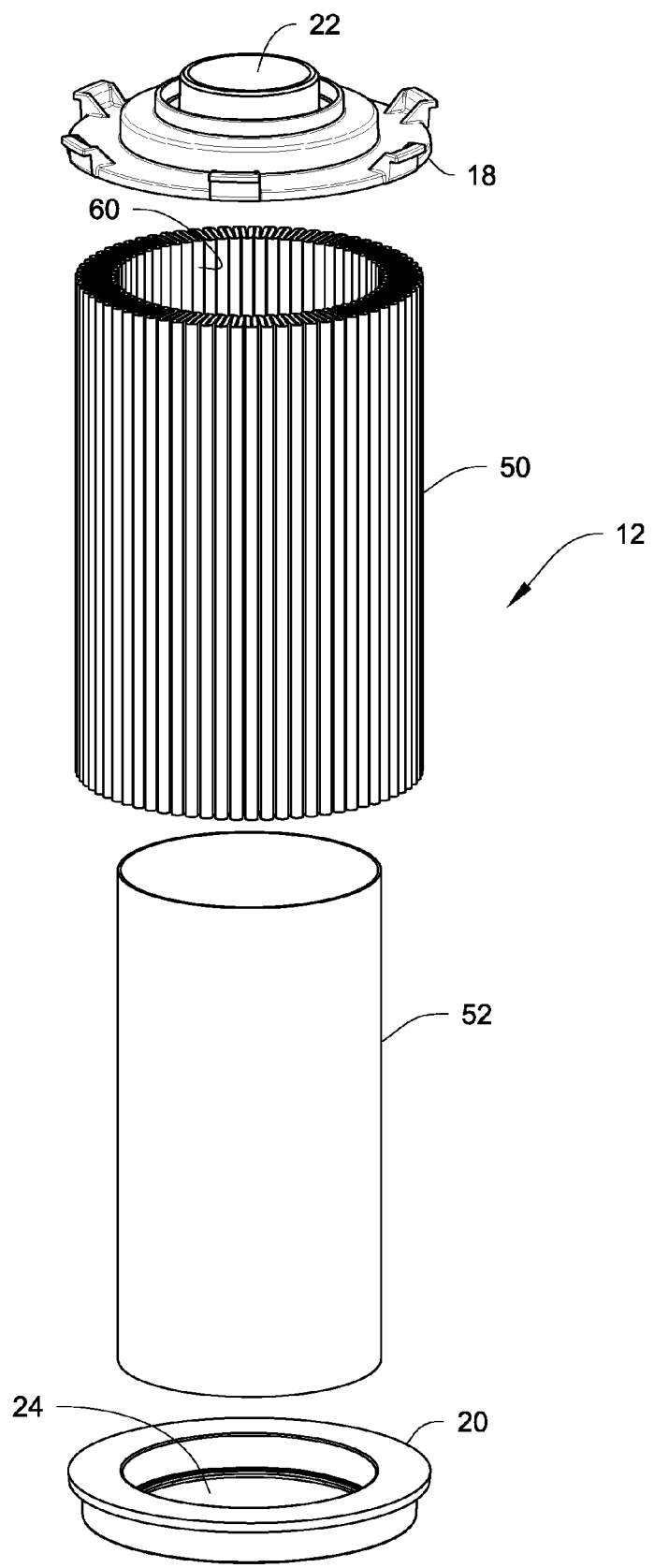
FIG. 4 is an exploded view of the first or outer stage of the two stage filter of FIGS. 1 and 2.
Figure 5:
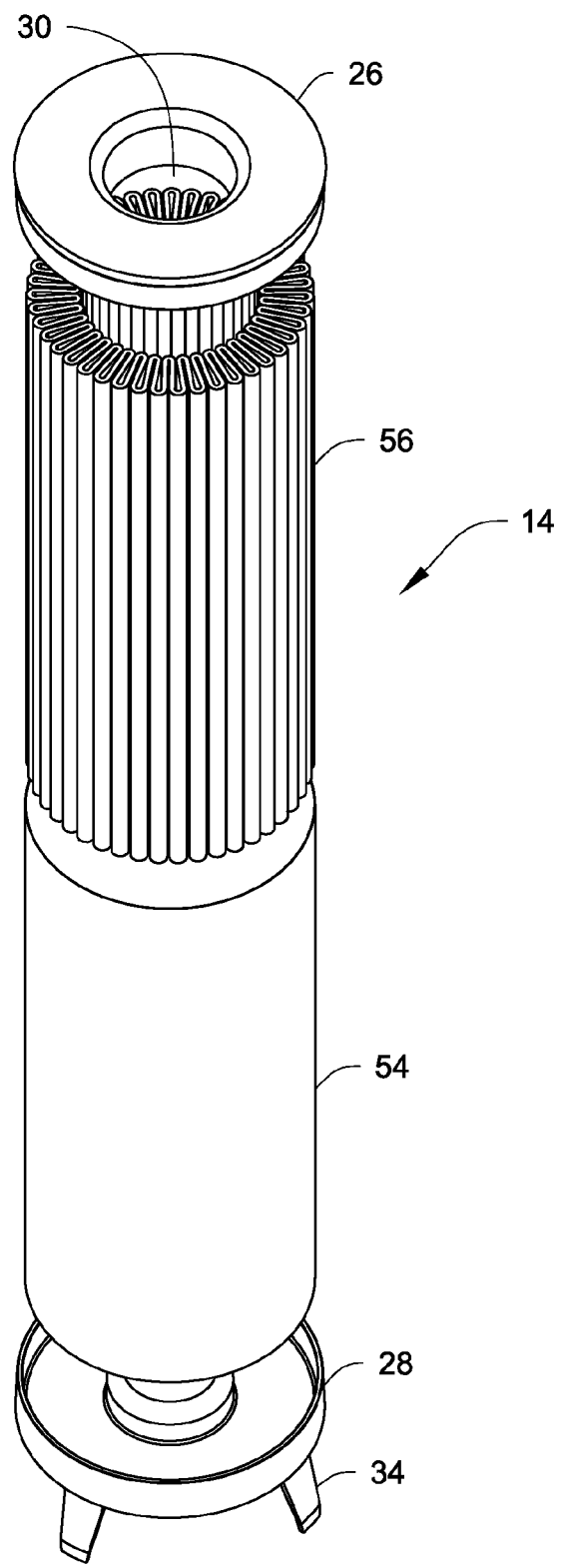
FIG. 5 is an exploded view of the second or inner stage of the two stage filter of FIGS. 1 and 2.

FIGS. 4 and 5 illustrate details of the first or outer coalescer stage 12 and the second or inner separator stage 14 of the filter 10, respectively. The stages 42, 44 of the filter 40 are configured substantially the same as the stages 12, 14, except for the endcaps, and will not be separately described.

As shown in FIGS. 2 and 4, the first or outer coalescer stage 12 includes a pleated cylinder 50 of polymeric media that when assembled surrounds a non-pleated cylinder 52 of polymeric media. As shown in FIGS. 2 and 5, the second or inner separator stage 14 includes a non-pleated cylinder 54 of polymeric media that when assembled surrounds a pleated cylinder 56 of polymeric media.

Turning to FIGS. 2 and 4, the pleated media 50 includes inner (i.e. downstream) pleat tips 60 that in use are positioned closely adjacent to the outer surface of the cylinder 52 such that there is no significant gap or separation between the two. In one embodiment, the inner pleat tips 60 are in intimate contact with the outer surface of the cylinder 52. The inner pleat tips 60 may or may not be attached or fixed to the outer surface of the cylinder 52, but are positioned closely adjacent to, for example in contact with, the cylinder.

Figure 6A:
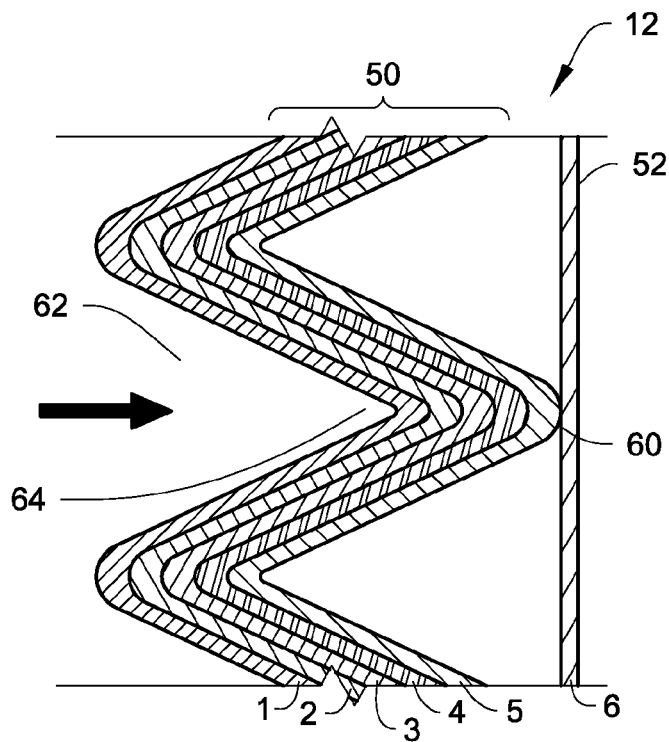
FIGS. 6A-6C show different configurations of the media layers of the first stage.

FIG. 6A shows a cross-sectional view of one embodiment of the first stage 12 with the thickness of the layers being exaggerated for clarity. In FIG. 6A, the downstream pleat tips 60 of the pleated media 50 are in direct, intimate contact with the outer surface of the non-pleated media 52, with the tips 60 being optionally fixed, or not fixed, to the outer surface. Thus, the embodiment in FIG. 6A does not utilize a center tube, screen, cage or other supporting structure for the media of the first stage 12. In this case, the non-pleated media 52 and/or the pleated media 50 would be stiff enough to act as its own supporting structure.

Figure 6B:
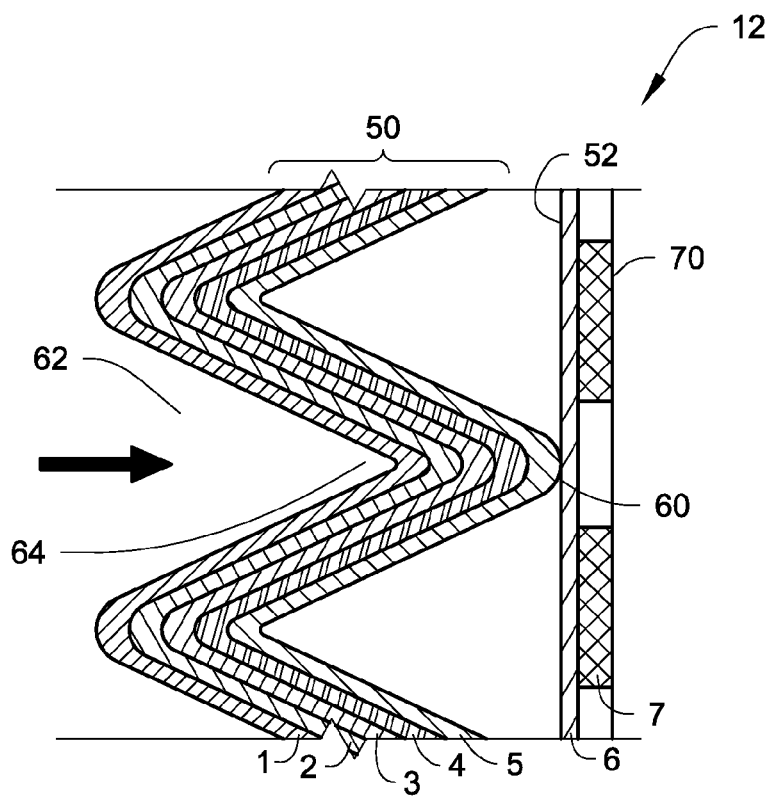

FIG. 6B shows another embodiment of the first stage, where a center tube, screen, cage, spring or other support cylinder structure 70 for the media of the first stage 12 is located downstream of and adjacent to the non-pleated media cylinder 52. The support structure 70, if used, can be formed from a polymeric material, for example thermoplastic material, and is provided with openings to allow fluid to flow through the first stage to the second stage. The optional support structure 70 is used to prevent the inner non-pleated media 52 from collapsing under the flow and pressure drop of the fluid. Ideally, however, the pleated 50 and non-pleated media 52 together provide sufficient strength and stiffness rendering use of the support structure 70 unnecessary. In the embodiment in FIG. 6B, the non-pleated media 52 may be affixed to the support structure 70 only at the endcaps because there is no need to bond it elsewhere due to the fluid pressure during use. Nonetheless, the non-pleated media 52 can be fixed to the support structure 70 at any locations one finds suitable.

Figure 6C:
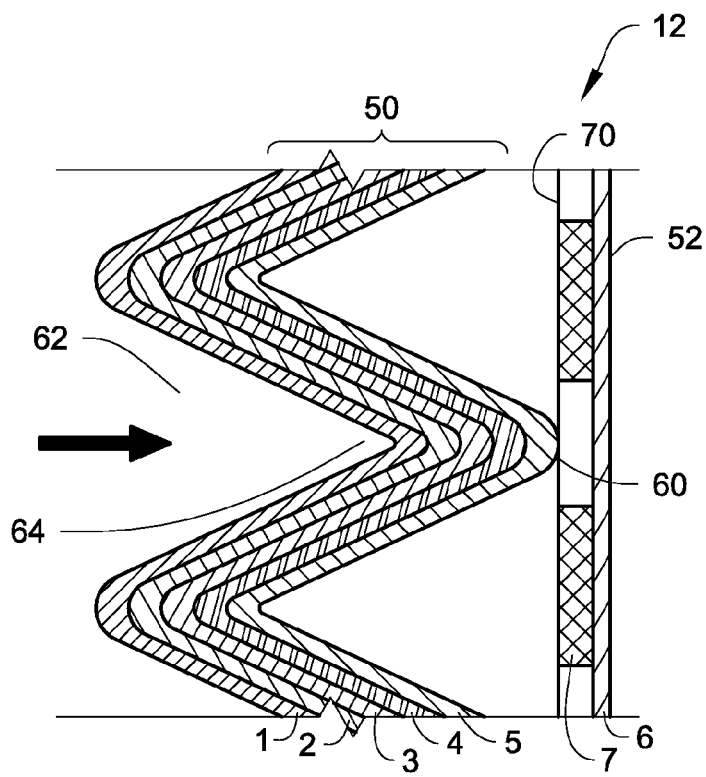

FIG. 6C shows another embodiment of the first stage, where the support structure 70 is located between, adjacent to, and touches both the upstream pleated media 50 and the downstream non-pleated media 52. In FIG. 6C, the support structure 70 provides support to the pleated media 50, whose inner pleat tips 60 are in intimate contact with it, while the non-pleated media 52 is located inside and downstream of, and in intimate contact with, the support structure 70. The non-pleated media 52 may be thermally welded to or injection molded with the polymeric support structure 70 to affix it to the support structure.

In FIGS. 6A-6C, the numerals 1-5 indicate, in order from upstream to downstream in the direction of fluid flow, the different layers of media of one example of the pleated media 50. In the examples described herein, the media layers of the pleated media 50 are made of polymeric materials, for example thermoplastic materials.

In one embodiment, the pleated media 50 can include three layers of polymeric, fibrous filter media (1-3), one layer of polymeric nanofiber media (4), and a final layer (5) of polymeric, fibrous media. In this example, the non-pleated media 52 is a single layer of polymeric, fibrous media formed as a tube and placed inside the pleated media 50 with its upstream face either in direct contact with the pleated media via the pleat tips 60 or in indirect contact with the pleated media 50 via the intermediary support structure 70.

Typically, the axial lengths $L_1$ (see FIG. 2) of the layers of the pleated media 50, the non-pleated media 52, and the support structure (if used) are the same, with the ends of each embedded into the endcaps 18, 20 or potted in an adhesive, e.g., polyurethane, or otherwise attached to the endcaps in a manner to prevent bypass of unfiltered fluid around the media.

While FIGS. 6A-6C show five layers for the pleated media 50, and one layer for the non-pleated media 52, more or less layers may be used for the pleated media 50 and the non-pleated media 52 depending, for example, on the requirements of the application and coalescer design.

The function and design constraints for each layer of the first or coalescer stage 12 and how and when they are used will now be described. For illustrative purposes, examples of each layer are described in Table 1 for three different media combinations, referred to as Coalescer X, Y, and Z. It is noteworthy that these three media combinations reflect design choices based on the recognition that in low interfacial tension fuels, such as ULSD and biodiesel, there is relatively little thermodynamic drive for coalescence and the kinetics of coalescence tend to be slow. The examples described herein are designed to physically slow down the passage of water droplets through the media and to increase their concentration locally within the coalescer.

The media combinations, materials and properties listed in Table 1 are exemplary only, and reflect combinations, materials and properties that the inventors believe, at the time of filing this application, would provide adequate performance results with respect to high pressure common rail diesel fuel systems running on ULSD or biodiesel. Further research may reveal suitable media combinations, materials and material properties other than those listed in Table 1, both with respect to high pressure common rail diesel fuel systems running on ULSD or biodiesel and with respect to other types of fluids on other types of systems.

Therefore, while Table 1 lists various specific thermoplastic materials such as polyamide, polybutylene terephthalate, and polyethylene terephthalate, the media layers are not limited to these specific thermoplastic materials. Other thermoplastic materials could be used. Further, the media layers are not limited to thermoplastic materials. Other polymeric materials could be used for the media layers including, but not limited to, thermosetting plastics.

TABLE 1

Exemplary Media Layers and Properties for Outer Stage

| Layer | Material | Nominal Mean Fiber Diameter (μm) | Mean Pore Size (μm) | Max Pore Size (μm) | Permeability (cfm) | Thickness (mm) | Basis Weight (gsm) |
|---|---|---|---|---|---|---|---|
| Coalescer X - Velocity Change Coalescer | | | | | | | |
| 1 | Polybutylene terephthalate Nonwoven | >10 | >50 | >100 | >250 | >0.3 | >40 ± 5 |
| 2 | Polybutylene terephthalate Nonwoven | 1.0-4.0 | 5.0-15.0 | 10.0-20.0 | 35-55 | 0.7-0.15 | 27 ± 5 |
| 3 | Polybutylene terephthalate Nonwoven | 1.0-5.0 | 15.0-30.0 | 25.0-40.0 | 75-100 | 0.15-0.3 | 33 ± 5 |
| 4 | Polyamide Nonwoven | 0.1-1.0 | <8.0 | 5.0-15.0 | 5.0-20.0 | 0.1-0.25 | >20 |
| 5 | Polyethylene terephthalate Nonwoven | >40 | 20.0-40.0 | 40-60 | 50-75 | 0.4-0.7 | 198 ± 20 |
| 6 | Polyethylene terephthalate Nonwoven | >20 | 25-45 | 40-60 | 150-200 | 0.8-1.2 | 100 ± 20 |
| Coalescer Y - Single Layer Surface Coalescer | | | | | | | |
| 4 | Polyamide Nonwoven | 0.1-1.0 | <8.0 | 5.0-15.0 | 5.0-20.0 | 0.1-0.25 | >20 |
| 5 | Polyethylene terephthalate Nonwoven (optional) | >40 | 20.0-40.0 | 40-60 | 50-75 | 0.4-0.7 | 198 ± 20 |
| 6 | Polyethylene terephthalate Nonwoven | >20 | 25-45 | 40-60 | 150-200 | 0.8-1.2 | 100 ± 20 |
| Coalescer Z - Surface Coalescer | | | | | | | |
| 3 | Polybutylene terephthalate Nonwoven | 1.0-5.0 | 15.0-30.0 | 25-40 | 75-100 | 0.15-0.3 | 33 ± 5 |
| 4 | Polyamide Nonwoven | 0.1-1.0 | <8.0 | 5.0-15.0 | 5.0-20.0 | 0.1-0.25 | >20 |
| 5 | Polyethylene terephthalate Nonwoven (optional) | >40 | 20-40 | 40-60 | 50-75 | 0.4-0.7 | 198 ± 20 |
| 6 | Polyethylene terephthalate Nonwoven | >20 | 25-45 | 40-60 | 150-200 | 0.8-1.2 | 100 ± 20 |

In Table 1 (and Table 2 below): gsm is defined as grams per square meter and cfm is defined as cubic feet per minute; thickness is measured from upstream to downstream relative to the primary direction of fluid flow through the media layers.

Coalescer X

The example of Coalescer X includes at least 6 media layers, and an optional supporting structure can be used. Layers 1-5 form the pleated media 50 and layer 6 forms the non-pleated cylinder 52. Coalescer X may be referred to as a velocity change coalescer (see for example PCT Publication No. WO 2010/042706) for use in a filter-in-filter design.

Layer 1 functions as a prefilter and reduces the pressure drop across the outer stage 12. Layer 1 is more open (e.g. has a higher porosity, larger pore size, larger mean fiber diameter, higher Frasier permeability, and/or lower contaminant removal efficiency) than Layer 2.

Layer 2 functions to capture fine emulsified droplets, for example water droplets in ULSD fuel. Layer 2 is tighter (e.g. having a lower porosity, smaller pore size, smaller mean fiber diameter, lower Frasier permeability, and/or higher contaminant removal efficiency) than Layer 3.

Layer 3 functions to reduce the fluid velocity within the layer and provide a space for droplets captured in Layer 2 to drain to, accumulate and coalesce. The physical properties of Layer 3 are such that the fluid velocity in this layer is less than in Layer 4. Layer 3 is more open (e.g. has a higher porosity, larger pore size, larger mean fiber diameter, higher Frasier permeability, and/or lower contaminant removal efficiency) than Layer 4.

Layer 4 functions to capture droplets that were not captured by the previous layers, especially the finer droplets, and to serve as a semi-permeable barrier to the passage of captured droplets. The semi-permeable barrier function causes droplets to concentrate and accumulate in Layer 3, giving them more time and greater probability for coalescence to occur. Layer 4 also gives rise to localized increased fluid velocity and a transient increase in drop surface area, which further enhances coalescence. The fluid velocity in Layer 4 is higher than in Layer 5. Layer 4 is tighter (e.g. has a lower porosity, smaller pore size, smaller mean fiber diameter, lower Frasier permeability, and/or higher contaminant removal efficiency) than Layer 5.

Layer 4 can be, for example, a thermoplastic nanofiber filter media with fibers having a diameter of less than about 1 μm, which helps achieve the very high water removal efficiency requirements for modern high pressure common rail diesel fuel systems running on ULSD or biodiesel. Layer 4 can be formed using an electroblowing process, but can be formed using other suitable processes. In addition to the properties listed in Table 1 for Layer 4, Layer 4 can also have a maximum to mean pore size ratio of less than about 3, and more preferably less than about 2.

Layer 5 functions to create a lower velocity environment for the coalesced drops formed in the previous layers to collect in and drain through prior to release. Layer 5 is more open (e.g. has a higher porosity, larger pore size, larger mean fiber diameter, higher Frasier permeability, and/or lower contaminant removal efficiency) than Layer 4.

Layer 6 (i.e. the non-pleated cylinder 52) functions to provide release sites for coalesced drops. As such, Layer 6 is more open (e.g. has a higher porosity, larger pore size, larger mean fiber diameter, higher Frasier permeability, and/or lower contaminant removal efficiency) than Layer 5. In one embodiment, Layer 6 also provides structural support for the first stage 12 as discussed above for FIG. 6A, eliminating the need for a separate support structure.

Coalescer Y

In the example of Coalescer Y, two to three media layers are used with or without an optional support structure. Coalescer Y may be referred to as a single layer surface coalescer (see U.S. Patent Application Ser. No. 61/178,738 filed on May 15, 2009 and U.S. patent application Ser. No. 12/780,392 filed on May 14, 2010) for use in a filter-in-filter design.

The first layer, Layer 4, functions to provide a semi-permeable barrier to the passage of fine emulsified droplets, forcing them to concentrate at its upstream surface. In this manner, droplets have time and a suitable environment for coalescence and drop growth to occur. Layer 4 is a relatively tight layer with characteristics comparable to Layer 4 in Coalescer X or even tighter. Layer 4 relies on sieving to prevent passage of fine droplets, and in this example can be a thermoplastic nanofiber filter media with fibers having a diameter of less than about 1 µm, a mean pore size smaller than the mean drop size of the influent droplets and can have a maximum to mean pore size ratio of less than about 3, and preferably less than about 2. Layer 4 can be formed using an electroblowing process, but can be formed using other suitable processes.

Layer 5 is optional and provides structural support for Layer 4, if required, and serves as a drainage path for coalesced drops forced through Layer 4. Layer 5 also connects Layer 4 to the release Layer 6 (i.e. non-pleated cylinder 52). Layer 5 creates a lower velocity environment for the coalesced drops to collect in and drain through prior to release. Layer 5 (if used) is more open than Layer 4 and is structurally stronger, to provide support to Layer 4 and facilitate processing of the filter media.

Coalescer Y has an additional non-pleated Layer 6 (i.e. non-pleated cylinder 52) downstream of Layer 4 and optional Layer 5 that provides release sites for coalesced drops. Layer 6 is more open than optional Layer 5.

Coalescer Z

In the example of Coalescer Z, three or more media layers with an optional support structure are used (see U.S. Patent Application Ser. No. 61/179,170 filed on May 18, 2009; U.S. Patent Application Ser. No. 61/179,939 filed on May 20, 2009; and U.S. patent application Ser. No. 12/780,392 filed on May 14, 2010. Coalescer Z is a more complex surface coalescer than Coalescer Y for use in a filter-in-filter design.

Layer 3 functions to reduce the pressure drop across the coalescer and serves as a particulate prefilter for the coalescer and to increase its service life. Layer 3 is more open than Layer 4 and has a higher capillary pressure (i.e. a more positive capillary pressure) than Layer 4.

The functions and properties of Layer 4, Layer 5 (optional) and Layer 6 are as described for Coalescer Y.

In all three Coalescers X, Y, and Z, the nature of the transition from Layer 5 to Layer 6 is of interest. In the illustrated and described embodiments, layers 1-5 are pleated. As such, the fluid flow profile within the pleats and drag on captured droplets causes them to accumulate in the valleys 62 (downstream direction) of the pleats. This results in droplets concentrating in this localized region, increasing coalescence by providing increased time for drops to coalesce before they are released. The inventors have observed that coalesced drops tend to be released from the same active regions or areas on the downstream face of coalescers, while little drop release occurs elsewhere. This suggests that once a drainage path through the media is created, it is repeatedly used.

In the described first stage, preferred drainage paths ending in larger pores are created by the intimate contact of the inner pleat tips of Layer 4 (for Coalescers Y and Z) or Layer 5 (for Coalescer X, as well as Coalescers Y and Z if Layer 5 is included) to the upstream surface of unpleated Layer 6. At the point of contact between the pleated media and the non-pleated media, a localized disruption of the media pore structure exists which gives rise to these preferred drainage paths. The result is larger drops are released. Further, these drainage paths occur at the bottoms 64 of the pleat valleys 62 (see FIGS. 6A, 6B and 6C) where coalesced drops tend to concentrate and the effect is greatest. The contact between Layers 4 or 5, and Layer 6 need not be direct. Instead, the same benefits can be achieved indirectly by having the inner or downstream pleat tips 60 of the pleated media 50 in direct contact with the porous support structure 70, which is in turn in direct contact with Layer 6 (i.e. non-pleated cylinder 52) on its downstream side, as shown in FIG. 6C.

In an additional embodiment, the pleated media 50 could be as described in the exemplary Coalescers X, Y or Z described above, except that Layer 6, i.e. the non-pleated cylinder 52, would be absent. This additional embodiment achieves the same fluid flow profile within the pleat and drag on capture drops effects as Coalescers X, Y or Z, to cause droplets and coalesced drops to concentrate in the valleys 62 of the pleats to enhance coalescence. However, instead of coalesced drops draining to Layer 6, drops are released from small slits or holes (i.e. apertures) in the inner pleat tips 60. These apertures could be produced by needle punching or other means and can be on the order of 30-300 µm in size. The apertures serve as release points for the coalesced drops.

Figure 8:
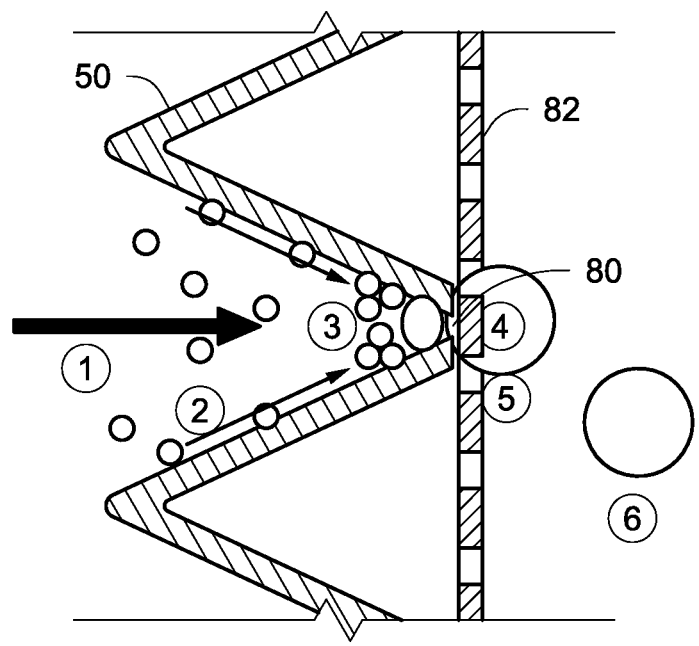
FIG. 8 shows an example of an outer stage with slits, holes or apertures formed in the downstream pleat tips to form release sites.

FIG. 8 illustrates an example of apertures 80 formed in the inner pleat tips of the pleated media 50. An optional layer 82 with relatively large pore size (compared to the media 50), which can be equivalent to the non-pleated cylinder 52 or the support structure 70, can also be present. As illustrated in FIG. 8, during flow, emulsion containing water droplets flows into the pleat at (1). At (2), water droplets unable to penetrate the barrier formed by the media flow along the media surface to the valley of the pleat. At (3), water droplets collect in the valley and coalesce into drops. At (4), pressure drop forces coalesced drops through an aperture 80 in the pleat tip. At (5), drops release through the layer 82 if present. At (6), coalesced water drops settle out and/or are carried downstream to the outer, non-pleated cylinder 54 of the second stage 14 where they are separated out and drain.

Figure 7:
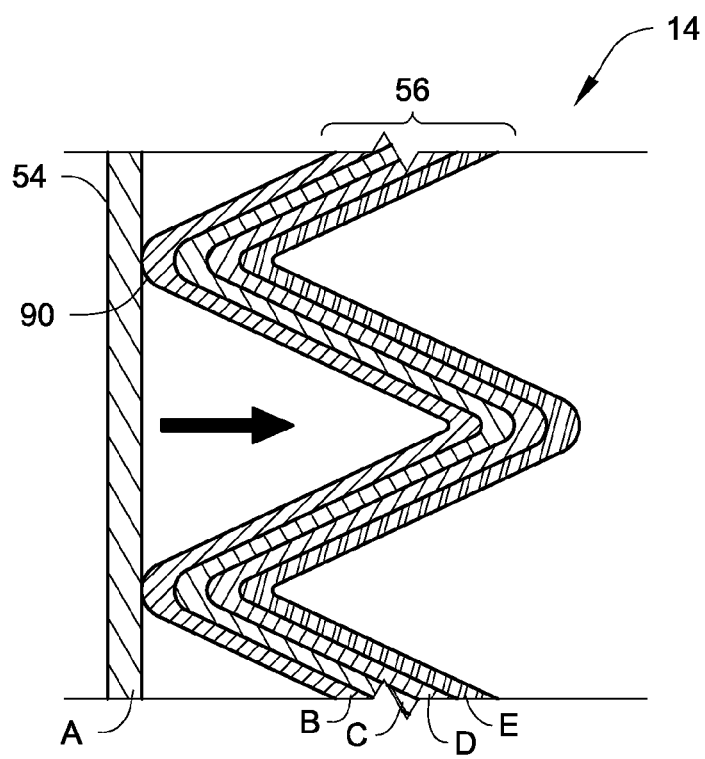
FIG. 7 shows an exemplary configuration of the media layers of the second stage.

FIG. 7 and Table 2 provide an exemplary configuration of the second or inner separating stage 14. The second stage 14 serves to separate coalesced water drops from the fluid and to remove fine solid contaminants from the fluid. The second stage 14 includes the outer, non-pleated cylinder 54 in intimate contact with the outer pleat tips of the inner multi-layer pleated cylinder 56.

As shown in FIG. 2, the axial lengths $L_2$ of the non-pleated cylinder 54 and the pleated cylinder 56 are substantially the same, with the ends of the cylinders embedded into the endcaps 26, 28 or potted in an adhesive, for example polyurethane, or otherwise attached to the endcaps in a manner to prevent bypass of unfiltered fluid around the media.

The media combinations, materials and properties listed in Table 2 are exemplary only, and reflect combinations, materials and properties that the inventors believe, at the time of filing this application, would provide adequate performance results with respect to high pressure common rail diesel fuel systems running on ULSD or biodiesel. Further research may reveal suitable media combinations, materials and material properties other than those listed in Table 2, both with respect to high pressure common rail diesel fuel systems running on ULSD or biodiesel and with respect to other types of fluids on other types of systems.

Therefore, while Table 2 lists various specific thermoplastic materials such as polyamide, polybutylene terephthalate, and polyethylene terephthalate, the media layers are not limited to these specific thermoplastic materials. Other thermoplastic materials could be used. Further, the media layers are not limited to thermoplastic materials. Other polymeric materials could be used for the media layers including, but not limited to, thermosetting plastics.

TABLE 2

Exemplary Media Layers and Properties of Inner Stage

| Layer | Material | Nominal Mean Fiber Diameter (μm) | Mean Pore Size (μm) | Max Pore Size (μm) | Permeability (cfm) | Thickness (mm) | Basis Weight (gsm) |
|---|---|---|---|---|---|---|---|
| A | Polyethylene terephthalate Woven Screen | * | 30-50 | 30-50 | 400-600 | 0.03-0.1 | 37 ± 10 |
| B | Polybutylene terephthalate Nonwoven | >10 | >50 | >100 | 225-325 | 0.3-0.5 | 48 ± 10 |
| C | Polybutylene terephthalate Nonwoven | 1.0-5.0 | 5.0-15.0 | 10.0-25.0 | 35-55 | 0.1-0.3 | 38 ± 10 |
| D | Polyamide Nonwoven | 0.1-0.8 | 1.0-8.0 | 1.0-10.0 | 3.0-20.0 | 0.1-0.3 | >20 |
| E | Polyethylene terephthalate Nonwoven | >40 | 20-35 | 40-65 | 50-75 | 0.45-0.65 | 198 ± 20 |

* Nominal mean fiber diameter for Layer A is believed at this time to be irrelevant for functionality In the example illustrated in FIG. 7 and in Table 2 above, the second stage includes at least five layers. Layer A (i.e. the non-pleated cylinder 54) functions to separate coalesced water drops from the fuel. Layer A can be, for example, a woven polymeric mesh in the form of a tube that repels the coalesced water drops and allows them to drain freely from the surface. Layer A is outside of and in intimate contact with the outer pleat tips 90 of the inner multi-layer pleated cylinder 56. The inventors currently believe that the mesh opening of Layer A should be less than 100 μm and preferably less than 50 μm for ULSD and biodiesel applications. However, further research may reveal other suitable mesh opening sizes.

The pleated layers (Layers B-E, i.e. pleated cylinder 56) function to capture solid contaminants and drops not removed by upstream layers. The first of these pleated layers, Layers B and C in FIG. 7 and Table 2, are transitional layers which reduce pressure drop, provide further removal of drops and droplets, and reduce solids from collecting on the following nanofiber filtration layer, Layer D. Layers B and C have properties similar to Layers 1 and 2 in the outer stage 12. Layer B also facilitates manufacturing and processing.

The next pleated layer, Layer D, functions as a high efficiency filter for fine particles, 4 μm(c) and smaller. For high pressure common rail applications, very high removal efficiencies for particles as small as 4 μm(c) are required to protect the fuel injectors. The layers upstream of Layer D function primarily to remove and separate water drops. Layer D functions to protect a downstream system, such as a high pressure common rail fuel injection system, from fine solids. Layer D also removes drops that may have passed through the preceding layers. Preferably, Layer D is tighter than any of the other layers of the outer stage 12 or the inner stage 14 and, in one exemplary embodiment, comprises thermoplastic nanofiber filter media with fibers having a diameter of less than 1 μm. At a minimum, Layer D should be as tight as Layer 4 of the outer stage 12.

The final layer, Layer E, functions to provide support for the preceding layers without significantly increasing the pressure drop. Layer E is a relatively open media with sufficient strength and stiffness to support the upstream layers of the inner stage 14 under conditions of use and enhance processability of the media of the inner stage 14.

The examples in Tables 1 and 2 above list the various media layers as being made from specific thermoplastic materials. The endcaps and the support structure 70 are also described as being made from thermoplastic materials. However, the performance advantages of the filter described herein can be obtained if some of the components are not thermoplastic, but are made of other polymeric materials or in some circumstances non-polymeric materials. For example, one or more of the media layers of the outer stage 12 and/or the inner stage 14 can be made from polymeric materials other than thermoplastic materials. In another embodiment, the endcaps can be formed of material other than thermoplastic, for example metal or other polymeric material such as thermoset plastics. In addition, the support structure 70 can be made of materials other than thermoplastic, for example other polymeric materials, metal or other materials known in the art.

Suitable polymeric materials that can be used for the various elements of the filter described herein may include, but are not limited to, polyamide material, polyalkylene terephthalate material (e.g., polyethylene terephthalate material or polybutylene terephthalate material), other polyester material, halocarbon material (e.g., Halar® brand ethylene chlorotrifluoroethylene (ECTFE), and polyurethane material.

The pleated media 50 and pleated media 56 may be formed using any suitable techniques known in the art including, but not limited to, melt-blowing two different layers of media one of top of another, by a wet laid process, electrospinning, electroblowing, melt-spinning, ultrasonically bonding, co-pleating, or otherwise chemically or physically bonding two or more different layers together, or using other techniques or combinations of techniques.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A two stage fluid filter comprising:
   an outer coalescer stage surrounding an inner separator stage with a gap therebetween, the outer coalescer stage including a pleated cylinder of polymeric media configured to coalesce water that is in a fluid, the pleated cylinder of polymeric media having pleat valleys and downstream pleat tips, and release sites located at or adjacent to the downstream pleat tips;
   the pleated cylinder of polymeric media of the outer coalescer stage having opposite ends that are fixed to endcaps;
   the inner separator stage including a non-pleated cylinder of polymeric media surrounding a multi-layer pleated cylinder of polymeric media, and the inner separator stage is configured to separate coalesced water from the fluid and remove fine solid contaminants from the fluid; and
   the non-pleated cylinder of polymeric media and the multi-layer pleated cylinder of polymeric media of the inner separator stage each have opposite ends that are fixed to endcaps, wherein the pleated cylinder of polymeric media of the outer coalescer stage comprises from upstream to downstream at least the following layers:
(i) a top layer comprising a polymeric nonwoven, the top layer having a mean fiber diameter of >10 µm, the top layer having a higher porosity, a larger pore size, a larger mean fiber diameter, a higher Frasier permeability, and a lower contaminant removal efficiency than a layer immediately downstream of the top layer;
(ii) a nanofiber layer comprising a polymeric nonwoven, the nanofiber layer having a mean fiber diameter of 0.1-1.0 µm, the nanofiber layer having a mean pore size of <8 µm; the nanofiber layer having a maximum to mean pore size ratio of less than about 3; and the nanofiber layer having a basis weight of greater than about 20 gsm; and
(iii) a support layer comprising a polymeric nonwoven, the support layer having a mean fiber diameter of >20 µm, the support layer having a higher porosity, a larger pore size, a larger mean fiber diameter, a higher Frasier permeability, and a lower contaminant removal efficiency than a layer immediately upstream of the support layer.

2. The two stage fluid filter of claim 1, wherein the fluid is fuel and the outer coalescer stage and the inner separator stage are configured to function with fuel.

3. The two stage fluid filter of claim 1, wherein the pleated cylinder of polymeric media of the outer coalescer stage further comprises an inner layer between the top layer and the nanofiber layer, the inner layer comprising a polymeric nonwoven, the inner layer having a nominal mean fiber diameter between about 1.0 to 5.0 µm, the inner layer having a mean pore size of between about 5.0 to 30.0 µm, and the inner layer having a higher Frasier permeability and a lower contaminant removal efficiency than the nanofiber layer.

4. The two stage fluid filter of claim 3, wherein the pleated cylinder of polymeric media of the outer coalescer stage further comprises a middle layer between the top layer and the inner layer, the middle layer comprising a polymeric nonwoven, the middle layer having a nominal mean fiber diameter between about 1.0 to 5.0 µm, the middle layer having a mean pore size of between about 5.0 to 30.0 µm, the middle layer having a lower Frasier permeability and a higher contaminant removal efficiency than the top layer, and the middle layer having a higher Frasier permeability and a lower contaminant removal efficiency than the inner layer.

5. The two stage fluid filter of claim 3, wherein the polymeric nonwovens comprise thermoplastic material.

6. The two stage fluid filter of claim 5, wherein the thermoplastic material of the nanofiber layer comprises a polyamide; and the thermoplastic material of the other layers comprises polyester, polyethylene terephthalate, or polybutylene terephthalate.

7. The two stage fluid filter of claim 3, wherein the outer coalescer stage further comprises a center tube that is non-pleated and is configured to provide support for the pleated cylinder.

8. The two stage fluid filter of claim 1, wherein the multi-layer pleated cylinder of polymeric media of the inner separator stage comprises from upstream to downstream at least the following layers:
(i) a top layer comprising a polymeric nonwoven, the top layer having a mean fiber diameter of >10 µm, the top layer having a higher porosity, a larger pore size, a larger mean fiber diameter, a higher Frasier permeability, and a lower contaminant removal efficiency than a layer immediately downstream of the top layer;
(ii) a nanofiber layer comprising a polymeric nonwoven, the nanofiber layer having a mean fiber diameter of 0.1-1.0 µm, and the nanofiber layer having a mean pore size of <8 µm;
(iii) a support layer comprising a polymeric nonwoven, the support layer having a mean fiber diameter of >20 µm, the support layer having a higher porosity, a larger pore size, a larger mean fiber diameter, a higher Frasier permeability, and a lower contaminant removal efficiency than a layer immediately upstream of the support layer.

9. The two stage fluid filter of claim 8, wherein the multi-layer pleated cylinder of polymeric media of the inner separator stage further comprises:
an inner layer comprising a polymeric nonwoven between the top layer and the nanofiber layer, the inner layer having a nominal mean fiber diameter between about 1.0 to 5.0 µm, the inner layer having a mean pore size of between about 5.0 to 30.0 µm, and the inner layer having a higher Frasier permeability and a lower contaminant removal efficiency than the nanofiber layer.

10. The two stage fluid filter of claim 9, wherein the non-pleated cylinder of polymeric media of the inner separator stage and the polymeric nonwovens comprise thermoplastic material.

11. The two stage fluid filter of claim 10, wherein the thermoplastic material of the nanofiber layer comprises a polyamide; and the thermoplastic material of the other layers comprises polyester, polyethylene terephthalate, or polybutylene terephthalate.

12. The two stage fluid filter of claim 1, wherein the polymeric media of the non-pleated cylinder of the outer coalescer stage comprises thermoplastic media.

13. The two stage fluid filter of claim 4, wherein in the pleated cylinder of polymeric media of the outer coalescer stage:
the top layer is configured to function as a prefilter and reduce pressure drop;
the middle layer is configured to capture fine emulsified water droplets;
the inner layer configured to reduce the fluid velocity;
the nanofiber layer is configured to capture water droplets not captured by the first, second and third layers; and
the support layer is configured to reduce fluid velocity.

14. The two stage fluid filter of claim 7, wherein the center tube is configured to provide release sites for coalesced water drops.

15. The two stage fluid filter of claim 9, wherein in the inner separator stage
the non-pleated cylinder of polymeric media is configured to separate coalesced water from the fluid; and
in the multi-layer pleated cylinder of polymeric media, the pleated top layer and the pleated inner layer are configured to reduce pressure drop; the pleated nanofiber layer is configured to act as a high efficiency filter for fine particles; and the pleated support layer is configured to support the non-pleated cylinder of polymeric media and the other pleated layers.

16. The two stage fluid filter of claim 1, wherein in the pleated cylinder of polymeric media of the outer coalescer stage, the downstream pleat tips comprise apertures formed therein.

17. The two stage fluid filter of claim 16, wherein the non-pleated cylinder of polymeric media of the outer coalescer stage comprises thermoplastic material.

18. A two stage fluid filter comprising:
a first stage spaced from and upstream of a second stage with a gap therebetween;

the first stage including: a pleated polymeric media configured to coalesce water that is in a fluid, the pleated polymeric media having pleat valleys and downstream pleat tips; a non-pleated polymeric media downstream of the pleated polymeric media; and release sites at or adjacent to the downstream pleat tips; and the second stage including a multi-layer pleated polymeric media and a non-pleated polymeric media upstream of the multi-layer pleated polymeric media, the second stage is configured to separate coalesced water from the fluid and remove fine solid contaminants from the fluid;

wherein the pleated polymeric media of the first coalescer stage comprises from upstream to downstream at least the following layers:

(i) a top layer comprising a polymeric nonwoven, the top layer having a mean fiber diameter of >10 μm, the top layer having a higher porosity, a larger pore size, a larger mean fiber diameter, a higher Frasier permeability, and a lower contaminant removal efficiency than a layer immediately downstream of the top layer;

(ii) a nanofiber layer comprising a polymeric nonwoven, the nanofiber layer having a mean fiber diameter of 0.1-1.0 μm, the nanofiber layer having a mean pore size of <8 μm; the nanofiber layer having a maximum to mean pore size ratio of less than about 3; and the nanofiber layer having a basis weight of greater than about 20 gsm; and (iii) a support layer comprising a polymeric nonwoven, the support layer having a mean fiber diameter of >20 μm, the support layer having a higher porosity, a larger pore size, a larger mean fiber diameter, a higher Frasier permeability, and a lower contaminant removal efficiency than a layer immediately upstream of the support layer.

19. The two stage fluid filter of claim 18, wherein the polymeric media of the first stage and the second stage comprises thermoplastic material.

20. The two stage fluid filter of claim 1, wherein the layers of the pleated cylinder of polymeric media are combined by ultrasonic bonding.

21. The two stage fluid filter of claim 18, wherein the layers of the pleated cylinder of polymeric media are combined by ultrasonic bonding.

22. A two stage fluid filter comprising:

an outer coalescer stage surrounding an inner separator stage with a gap therebetween, the outer coalescer stage including a multi-layer pleated cylinder of polymeric media configured to coalesce water that is in a fluid, the pleated cylinder of polymeric media having pleat valleys and downstream pleat tips, and release sites located at or adjacent to the downstream pleat tips;

the pleated cylinder of polymeric media of the outer coalescer stage having opposite ends that are fixed to endcaps;

the inner separator stage including a non-pleated cylinder of polymeric media surrounding a multi-layer pleated cylinder of polymeric media, and the inner separator stage is configured to separate coalesced water from the fluid and remove fine solid contaminants from the fluid; and the non-pleated cylinder of polymeric media and the multi-layer pleated cylinder of polymeric media of the inner separator stage each have opposite ends that are fixed to endcaps, wherein the multi-layer pleated cylinder of polymeric media of the outer coalescer stage comprises from upstream to downstream at least the following layers:

(i) a top layer comprising a polymeric nonwoven, the top layer having a mean fiber diameter of >10 μm, the top layer having a higher porosity, a larger pore size, a larger mean fiber diameter, a higher Frasier permeability, and a lower contaminant removal efficiency than a layer immediately downstream of the top layer;

(ii) a nanofiber layer comprising a polymeric nonwoven, the nanofiber layer having a mean fiber diameter of 0.1-1.0 μm, the nanofiber layer having a mean pore size of <8 μm; the nanofiber layer having a maximum to mean pore size ratio of less than about 3; and the nanofiber layer having a a basis weight of greater than about 20 gsm; and (iii) a support layer comprising a polymeric nonwoven, the support layer having a mean fiber diameter of >20 μm, the support layer having a higher porosity, a larger pore size, a larger mean fiber diameter, a higher Frasier permeability, and a lower contaminant removal efficiency than a layer immediately upstream of the support layer; and wherein the multi-layer pleated cylinder of polymeric media of the inner separator stage comprises from upstream to downstream at least the following layers:

(i) a top layer comprising a polymeric nonwoven, the top layer having a mean fiber diameter of >10 μm, the top layer having a higher porosity, a larger pore size, a larger mean fiber diameter, a higher Frasier permeability, and a lower contaminant removal efficiency than a layer immediately downstream of the top layer;

(ii) a nanofiber layer comprising a polymeric nonwoven, the nanofiber layer having a mean fiber diameter of 0.1-1.0 μm, and the nanofiber layer having a mean pore size of <8 μm;

(iii) a support layer comprising a polymeric nonwoven, the support layer having a mean fiber diameter of >20 μm, the support layer having a higher porosity, a larger pore size, a larger mean fiber diameter, a higher Frasier permeability, and a lower contaminant removal efficiency than a layer immediately upstream of the support layer.

23. The two stage fluid filter of claim 22, wherein the layers of the multi-layer pleated cylinders of polymeric media of the outer coalescer stage and the inner separator stage are combined by ultrasonic bonding.

* * * * *